United States Patent
Durieux et al.

(10) Patent No.: US 7,503,592 B2
(45) Date of Patent: Mar. 17, 2009

(54) QUICK-COUPLING MALE PORTION, A QUICK COUPLING, AND A SET OF TWO SUCH QUICK COUPLINGS

(75) Inventors: Christophe Durieux, Gilly sur Isere (FR); Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 11/248,259

(22) Filed: Oct. 13, 2005

(65) Prior Publication Data

US 2006/0082148 A1 Apr. 20, 2006

(30) Foreign Application Priority Data

Oct. 14, 2004 (FR) .................................. 04 10868

(51) Int. Cl.
*F16L 39/00* (2006.01)
(52) U.S. Cl. .................... 285/316; 285/93; 285/276; 285/308; 285/399
(58) Field of Classification Search ............. 285/308, 285/316, 276, 315, 314, 305, 307, 313, 374, 285/403, 93, 399, 322.2, 39
See application file for complete search history.

(56) References Cited

U.S. PATENT DOCUMENTS 3,112,767 A * 12/1963 Cator .................. 137/614.06
4,453,748 A * 6/1984 Ekman ........................ 285/316
4,637,914 A * 1/1987 Boyle et al. ................ 376/353
5,139,444 A * 8/1992 Garay et al. ................ 439/668
6,032,537 A * 3/2000 McLaren ...................... 73/756
6,073,973 A * 6/2000 Boscaljon et al. ............. 285/81
2001/0047593 A1 * 12/2001 Williams et al. ......... 33/501.45
2004/0018775 A1 * 1/2004 Mazzullo et al. ........... 439/676
2004/0063348 A1 * 4/2004 Jenkinson et al. .......... 439/180

FOREIGN PATENT DOCUMENTS

FR 1 556 209 A 2/1969
GB 1 533 080 A 11/1978

* cited by examiner

*Primary Examiner*—James M Hewitt
*Assistant Examiner*—Jay R Ripley
(74) *Attorney, Agent, or Firm*—Dowell & Dowell, P.C.

(57) ABSTRACT

The coupling (1) is for coupling a hose (T) to a mold (M). Its male portion has a male plug (6) for insertion into a female portion (2) of the quick coupling and for being locked therein by balls (11). A locking ring (10) for driving the balls (11) is movable relative to the male plug (6) between a first position in which the balls (11) can be retracted radially inside the locking ring (10), and a second position in which the balls (11) are constrained to project laterally from the locking ring (10). The male plug (6) carries a visual indicator (13) which is at least partially uncovered when said locking ring (10) is in its second position, and that is masked by said locking ring (10) when said locking ring (10) is in its first position.

11 Claims, 5 Drawing Sheets

QUICK-COUPLING MALE PORTION, A QUICK COUPLING, AND A SET OF TWO SUCH QUICK COUPLINGS

BACKGROUND OF THE INVENTION

1. Field of the Invention

The present invention relates to the field of circuits for cooling molds, in particular for injection molding parts made of polymer. More precisely, the invention relates to the male portion of a quick coupling for making a temporary junction between a cooling liquid feed hose of such a mold and a duct formed in the mold. The invention also relates to such a quick coupling and to a set of such quick couplings.

2. Brief Description of Related Art

A quick coupling suitable for being used for temporarily connecting a hose to a mold is described in French patent No. 1 556 209. It comprises a female portion and a male portion, with a male plug for insertion in said female portion. Normally, the female portion and the male portion of the quick coupling are secured respectively to the injection mold and to one end of the hose to be connected.

In addition to the male plug, the male portion of the coupling includes locking balls that can be moved between two positions by a locking ring that is slidably mounted on the male plug. In one of those two positions, the balls project outside the ring and can penetrate into an internal groove of the female portion so as to prevent the male and female portions of the coupling being separated. In their other position, the balls are retracted so that the male portion can be engaged in the female portion or separated therefrom.

The coupling can be unlocked by pushing the male plug in the direction for insertion into the female portion, i.e. towards a position in which the male plug is engaged more deeply in the female portion than it is when the coupling is locked. Consequently, while making a coupling, there is a risk that the male plug will be engaged all the way into said position and might remain therein in spite of the action of a return spring urging the locking ring towards a position in which the locking balls project. The hose for connection is flexible, and it is often resiliently curved while being coupled to the mold, and as a result can exert a bias force against the force exerted by the return spring of the ring.

Because of friction against a sealing ring that provides sealing between the male and female portions of the coupling, there is also a risk that the operator will think that the male plug has been pushed far enough into the female portion, even when that is not the case, and the locking balls have not reached the internal groove in the female portion.

Even though poor locking can lead to the male plug being ejected from the female portion and thus to injuries such as burns, such poor locking of male and female coupling portions one in the other is made all the more likely given that: the molds of an injection molding machine are changed very often; a large number of cooling circuits are needed to obtain very good cooling in the common circumstance of the parts for molding being complex, and/or in the even more common circumstance of high rates of production throughput leading to a large quantity of couplings often being concentrated in a small space; concentrating numerous couplings in a small space reduces accessibility to the couplings; and the hoses are generally coupled to the mold by relatively un-qualified operators.

SUMMARY OF THE INVENTION

The invention thus has the object of at least improving the safety of machines for injection molding polymer parts.

To this end, the invention provides a quick coupling male portion for making a temporary junction between a hose for conveying a cooling liquid to or from a duct formed in a mold that is to have the cooling liquid pass therethrough, said male portion comprises a male plug for inserting in a female portion of the quick coupling, moving balls for locking the male plug in said female portion, and a locking ring for driving the locking balls, said locking ring being movable relative to the male plug between a first position in which the locking balls can be retracted radially inside the locking ring, and a second position that is axially offset from the first position in the insertion direction for inserting the male plug into said female portion, towards which said locking ring is urged resiliently and in which the locking balls are constrained to project laterally from the locking ring, the male plug being pierced by a passage for the cooling liquid, the male portion being characterized in that said male plug carries a visual indicator that is at least partially uncovered when said locking ring is in its second position, and that is masked by said locking ring when said locking ring is in its first position.

Advantageously, according to other characteristics of this quick coupling male portion:

the visual indicator is an indicator ring that is engaged on said male plug and that is of an appearance that is different from that of the male plug;

said male plug includes an abutment for said indicator ring and is provided with a spring urging the locking ring towards its second position while urging said indicator ring against said abutment;

said indicator ring is made of polymer;

said indicator ring guides the locking ring during sliding movement relative to the male plug and is made of a material such that the coefficient of friction of the material of the locking ring on the material of said indicator ring is smaller than the coefficient of friction of the material of the locking ring on the material of said male plug;

said indicator ring is clipped onto a portion in relief of the male plug; and said indicator ring carries an internal radially-extending portion in relief suitable for engaging in or on a complementary external peripheral portion in relief on the plug and for being held stationary relative thereto by cooperation between their shapes.

The invention also provides a quick coupling for making a temporary junction between a hose for conveying cooling liquid to or from a duct formed in a mold that is to have the cooling liquid pass therethrough, the quick coupling comprising a female portion having at least one internal portion in relief suitable for enabling balls to be engaged therein so as to lock the coupling in the coupled-together position, the coupling being characterized in that it includes a male portion as defined above and complementary to the female portion.

Advantageously, according to other characteristics of the quick coupling:

said female portion and said male portion are fitted respectively to the mold and to the hose; and the female portion carries a visual indicator of appearance that matches that of the visual indicator ring carried by the male plug.

The invention also provides a set of two couplings as defined above, with the appearance of the visual indicators of the first coupling differing from the appearance of the visual indicators of the second coupling.

BRIEF DESCRIPTION OF THE DRAWINGS

The invention can be well understood on reading the following description given purely by way of example and made with reference to the accompanying drawings, in which.

DETAILED DESCRIPTION OF THE PREFERRED EMBODIMENTS

Figure 1:
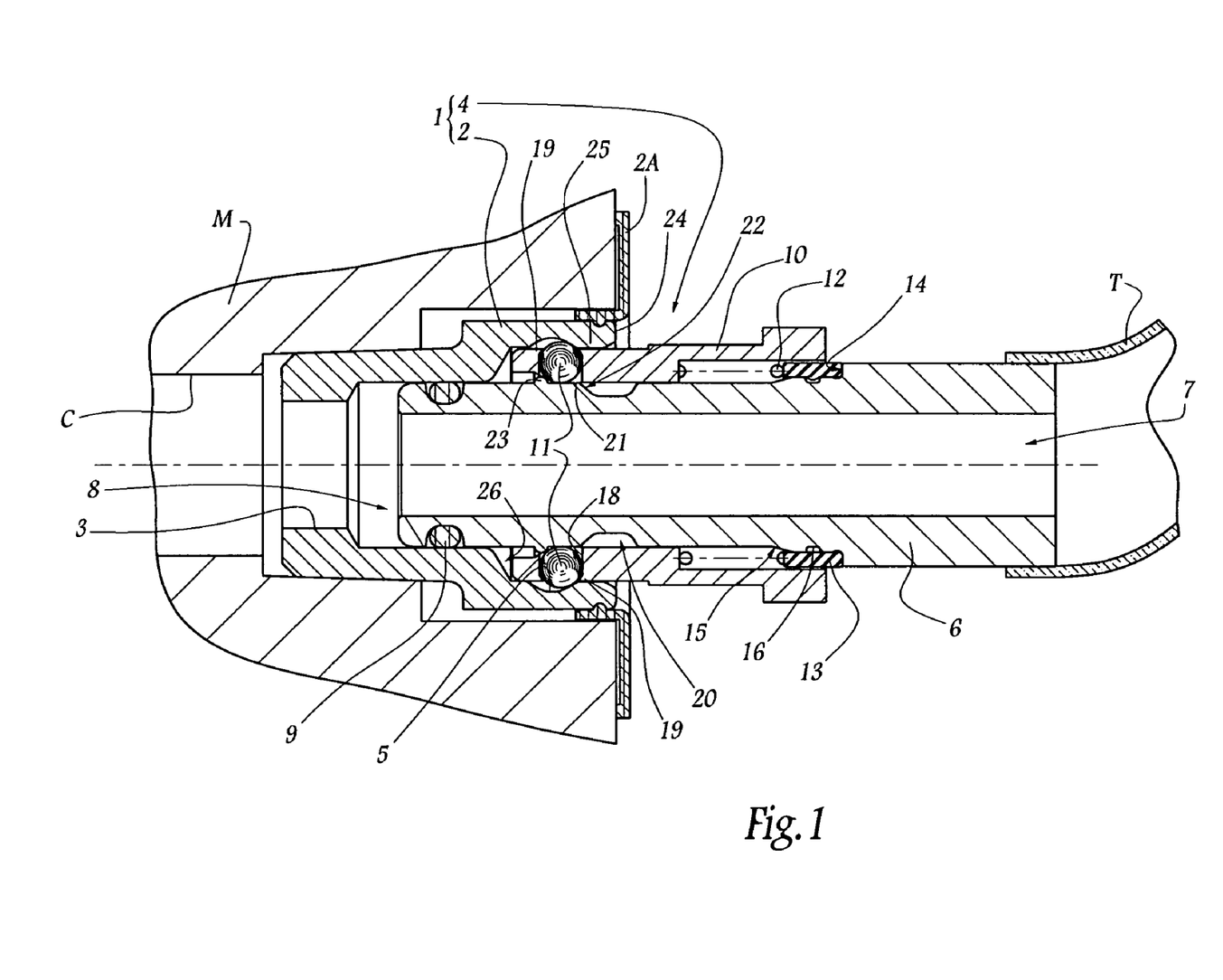
FIG. 1 is a diagrammatic axial section of a coupling in accordance with the invention coupling a flexible hose (shown in part) for feeding a cooling liquid to a mold (also shown in part) for injection molding parts made of polymer material.

In FIG. 1, a quick coupling 1 couples a flexible hose T to one end of a duct C formed in a mold M for injection-molding parts made of polymer material, the hose T serving to convey a cooling liquid for the mold M. A female portion 2 of the coupling 1 is secured by screw fastening or any other suitable manner to the mold M so that a passage 3 passing through it is connected in leaktight manner to the duct C. In addition to the female portion 2, the coupling 1 comprises a male portion 4 secured to one end of the hose T by using a fastening collar (not shown for reasons of clarity) or by using any other appropriate means.

The female portion 2 is constituted by a hollow metal part provided with a clipped-on collar 2A. As can be seen clearly in FIG. 2, an internal annular groove 5 is provided in the inside wall of the female portion 2 that defines the passage 3.

The male portion 4 comprises a male plug 6 for being engaged in an enlarged portion 3A of the passage 3. This male plug 3 has a through axial passage 7 for the cooling liquid. Close to its free end 8, it is provided with an annular sealing ring 9 made of elastomer and mounted in an annular groove provided for this purpose. In addition to the sealing ring 9, the plug 6 has engaged thereon: a locking ring 10 for moving locking balls 11 of the coupling 1; a return spring 12 urging the ring 10 towards the free end 8, i.e. in the insertion direction $F_1$ (FIG. 2) for inserting the male plug 6 into the female portion 2; and an indicator ring 13.

With the exception of the sealing ring 9, and of the indicator ring 13 which is made of polymer, these component parts of the male portion 4, and in particular the plug 6 and the locking ring 10, are made of metal.

FIGS. 1 to 5 are diagrammatic, in particular in that for reasons of clarity the plug 6 is shown therein as being a single part whereas in reality it is the result of assembling at least two parts together. These parts are separate while the locking ring 10 is being installed on the plug 6.

Figures 3, 4:
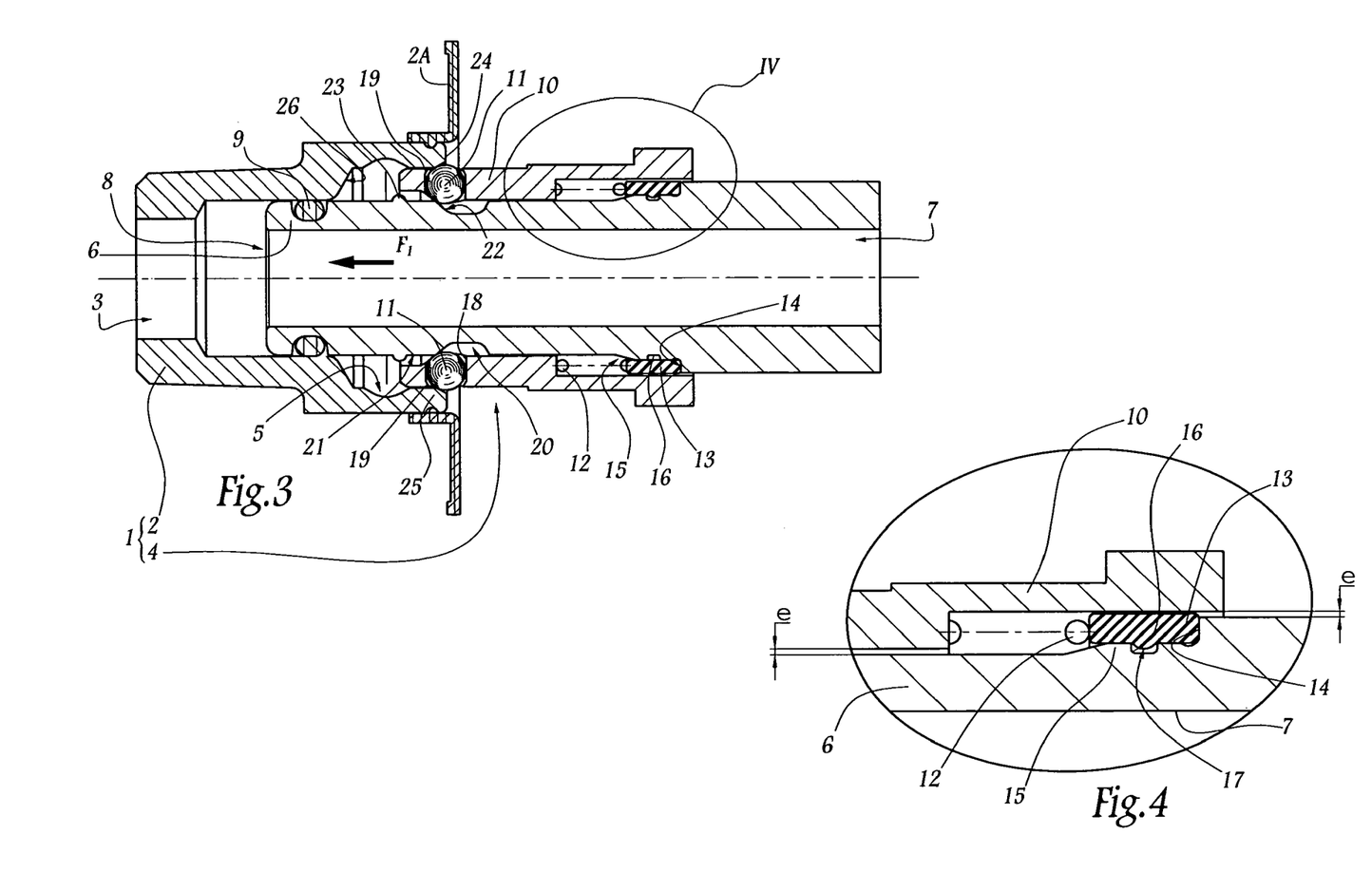
FIG. 3 is a section analogous to FIG. 2 showing a step in the engagement of the male and female coupling portions of FIGS. 1 and 2.
FIG. 4 is an enlarged view of a detail IV identified in FIG. 3.

The plug 6 has a shoulder 14 forming a stop abutment for the indicator ring 13. The spring 12 is compressed between the locking ring 10 and said indicator ring 13, so it urges the indicator ring against the shoulder 14 while also exerting a return force on the locking ring 10 towards the end 8. In addition to being held in place by the spring 12, the indicator ring 13 is clipped on an annular bulge 15 defined by the plug 6 and including an outer peripheral groove 16. As can be seen in FIG. 4, an inner radial projection 17 on the indicator ring 13 penetrates into the groove 16, thereby contributing to holding the indicator ring 3 stationary relative to the plug 6. In other words, the groove 16 and the projection 17 form two complementary portions in relief preventing the indicator ring 13 from moving along the plug 6 because of co-operation between their shapes. In a variant, the plug 6 could carry the projection 17 with the projection penetrating into a groove formed in the indicator ring 13. As will be understood, the indicator ring 13 is mounted by being deformed elastically.

Figure 2:
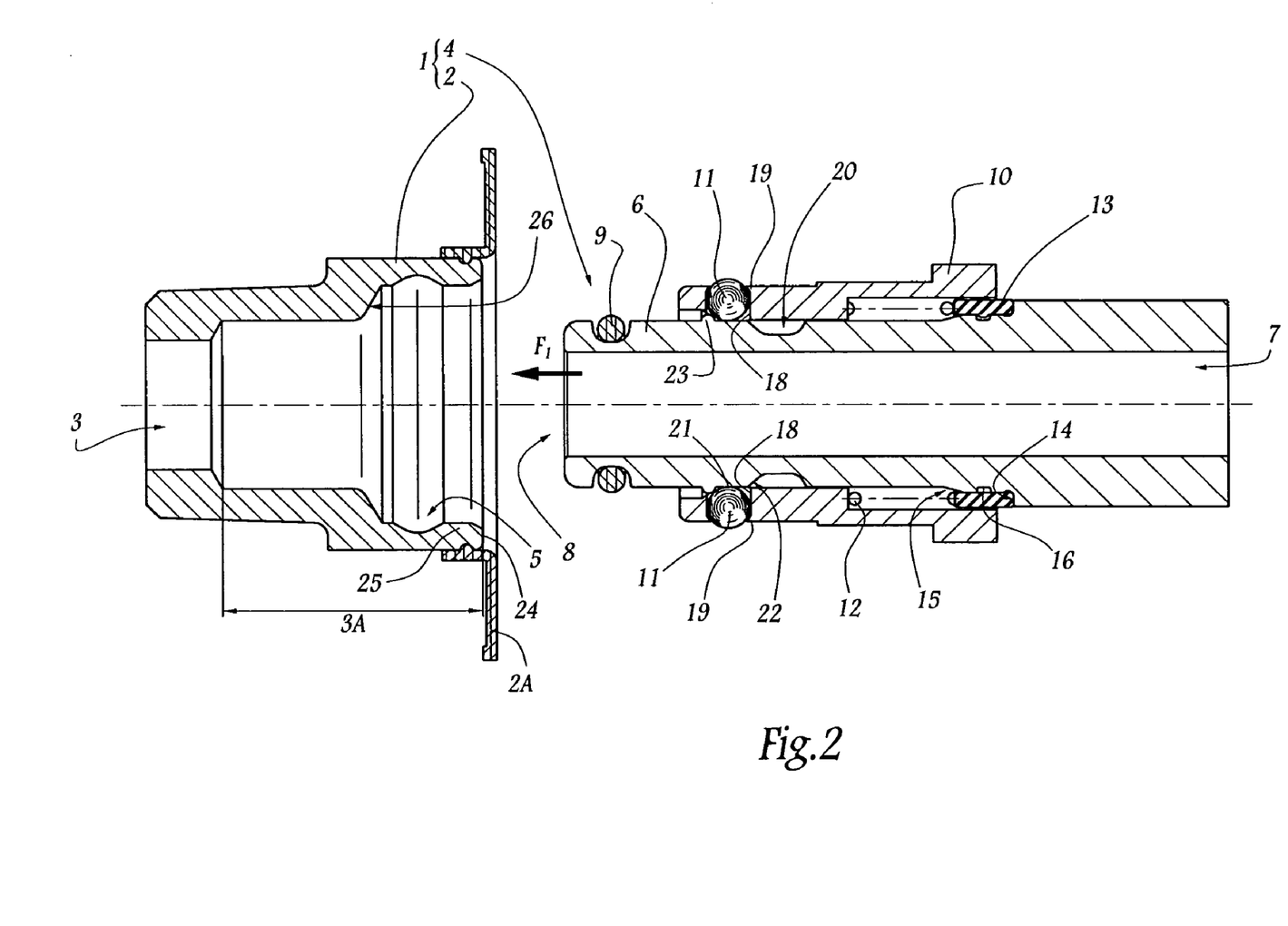
FIG. 2 is a section analogous to FIG. 1 showing the same coupling as in FIG. 1, but in which the complementary male and female portions of the coupling are shown apart, the mold and the hose being omitted to clarify the drawing.
Figure 5:
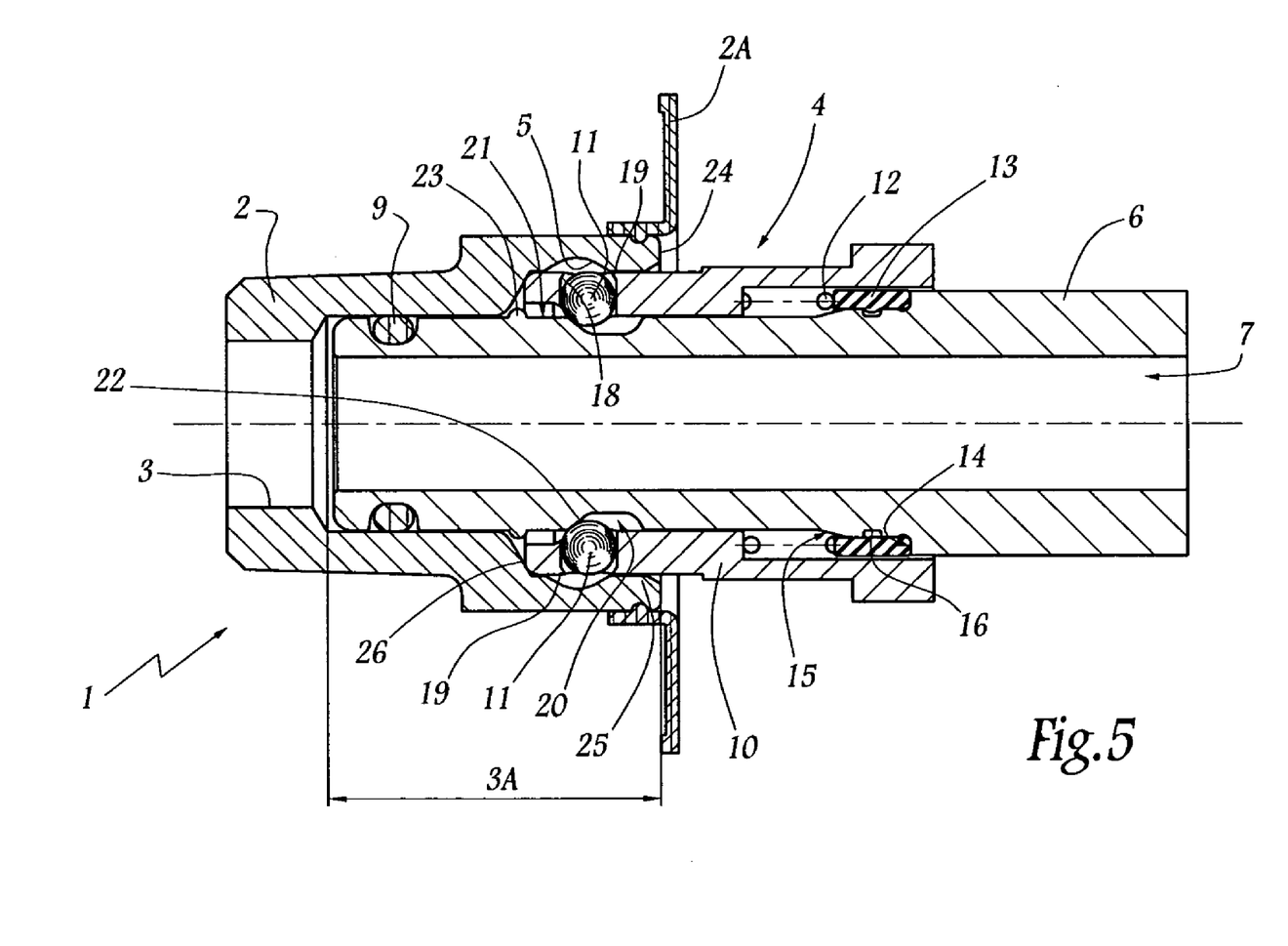
FIG. 5 is a section view analogous to FIG. 2 and shows the configuration of the coupling of FIGS. 1 to 4 in which its male and female portions can be separated.

A plurality of radial through holes 18 are formed in the locking ring 10. A ball 11 is mounted in each hole so as to be capable of being moved radially between two positions, with the ball projecting laterally from the locking ring 10 in one of those positions, as shown in FIGS. 1 and 2. In their other position, the balls 11 are retracted radially into the locking ring 10, as shown in FIG. 5. Each hole 18 includes a distal retaining constriction 19 serving to prevent the ball 11 located in the hole 18 from escaping therefrom.

In order to be retracted, the balls 11 must overlie an annular outer groove 20 in the plug 6, so as to be capable of penetrating therein. The locking ring 10 is movable along the plug 6 between two positions, in one of which the balls 11 are in register with the groove 20. In the other position of the locking ring 10, the balls 11 overlie an outer surface 21 of the plug 6 that is of a diameter greater than the diameter of the bottom of the groove 20. The spring 12 urges the locking ring 11 towards this other position that is axially offset in the insertion direction $F_1$ away from the position in which the balls 11 are in register with the groove 20. The diameter of the surface 21 is such that if the balls 11 overlie it, then it constrains the balls 11 to project out from the locking ring 10. A ramp 22 connects the bottom of the groove 20 to the surface 21.

The plug 6 is provided with an annular rim 23 that is adjacent to the surface 21 and that is too tall to allow the balls 11 to pass, thereby forming a stop abutment for the moving assembly constituted by the locking ring 10 and the balls 11.

As can be seen in FIG. 4, the locking ring 10 is mounted with clearance e on the plug 6 and with smaller clearance on the indicator ring 13. As a result, it slides on the indicator ring 13 but not on the plug 6. In other words, the indicator ring 13 guides the sliding of the ring 10. By selecting appropriate material for the indicator ring 13, the coefficient of friction of the material of the locking ring 10 on the material of the indicator ring 13 can be smaller than the coefficient of friction of the material of the locking ring 10 on the material of the plug 6. This occurs, as in the example shown, when the indicator ring 13 is made of polymer, while the plug 6 and the locking ring 10 are made of metal. This makes it easier for the ring 10 to slide along the plug 6, which is advantageous.

The indicator ring 13 is positioned along the plug 6 in such a manner as to be visible only when the locking ring 10 is in the position shown in FIG. 1 or in FIG. 2, i.e. in the position in which it places the balls 11 over the surface 21. When it is in its other position, i.e. in the position where it places the balls 11 over the groove 20, then the locking ring 10 masks the indicator ring 13, as shown in FIG. 5. The indicator ring 13 thus constitutes a visual indicator which can be used easily and quickly to determine the position of the locking ring 10 and thus the position of the balls 11, even though the balls are themselves hidden.

In order to ensure that it is particularly easy to determine whether the indicator ring 13 is visible or is masked by the locking ring 10, the indicator ring 13 is made in such a manner as to have a visual appearance that is very different from that of the plug 6. Thus, it has a color that is clearly different from that of the plug 6. In addition, because the indicator ring 13 is made of polymer, i.e. out of a material that is different from that of the plug 6 which is made of metal, the visual appearance of the indicator ring 13 is likewise easily distinguished from that of the plug 6.

Conversely, the collar 2A and the indicator ring 13 are both of the same color and are both made of the same material, even though they belong to different portions 2 and 4 of a given coupling 1. Because they are of matching appearance, they can be used as visual indicators to ensure that the portions 2 and 4 go together, which is advantageous.

In FIG. 2, the female portion and the male portion 4 of the coupling 1 are separate. The return force then exerted by the spring 12 causes the locking ring 10 to take up a position in which it places the balls 11 over the surface 21, where the balls 11 are thus constrained to project from the locking ring 10.

In order to couple together the female and male portions 2 and 4 of the coupling 1, the end 8 of the plug 6 is inserted and then pushed into the female portion 2. The balls 11 then encounter the distal edge 24 of the female portion 2. This distal edge 24 prevents the balls 11 from penetrating into the enlarged portion 3A of the passage 3 until the groove 20 reaches the balls 11, due to the plug 6 sliding in the locking ring 10 against the force from the spring 12. Under these circumstances, the coupling 1 is as shown in FIG. 3, and the balls 11 penetrate into the groove 20, thus enabling them to go past a constriction 25 separating the groove 5 from the distal edge 24. As the plug 6 continues to be inserted further into the female portion 2, the balls 11 in the groove 20 reach the groove 5, and the ramp 22 pushes them into the groove 20 because of the return force exerted by the spring 12. This force leads to the locking ring 10 sliding relative to the plug 6 until the coupling 1 takes up the position shown in FIG. 1. By reducing friction forces, the indicator ring 13 makes such sliding easier, which reduces the risk of the plug 6 being wrongly positioned at the end of the coupling operation, and thus, in accordance with the object of the invention, reduces the risk of the male and female portions of the coupling 1 not being properly locked together.

In FIG. 1, the surface 21 constrains the balls 11 to project laterally from the locking ring 10 and to penetrate into the groove 5, such that the balls 11 lock the coupled-together male and female portions of the coupling 1. The sealing ring 9 then seals the coupling between the passages 3 and 7.

If at the end of engaging the male portion 4 on the female portion 2, the plug 6 remains pushed in too far, i.e. as shown in FIG. 5, and in spite of the action of the spring 12, the locking ring 10 masks the indicator ring 13 which means that the balls 11 do not overlie the surface 21, i.e. that they are not in their locking position. The operator easily notices that the locking ring 10 is masking the indicator ring 13. This enables the operator to correct the position of the plug 6 relative to the female portion 2 and thus, in accordance with the object of the invention, prevent the male portion being ejected in accidental and dangerous manner.

Figure 6:
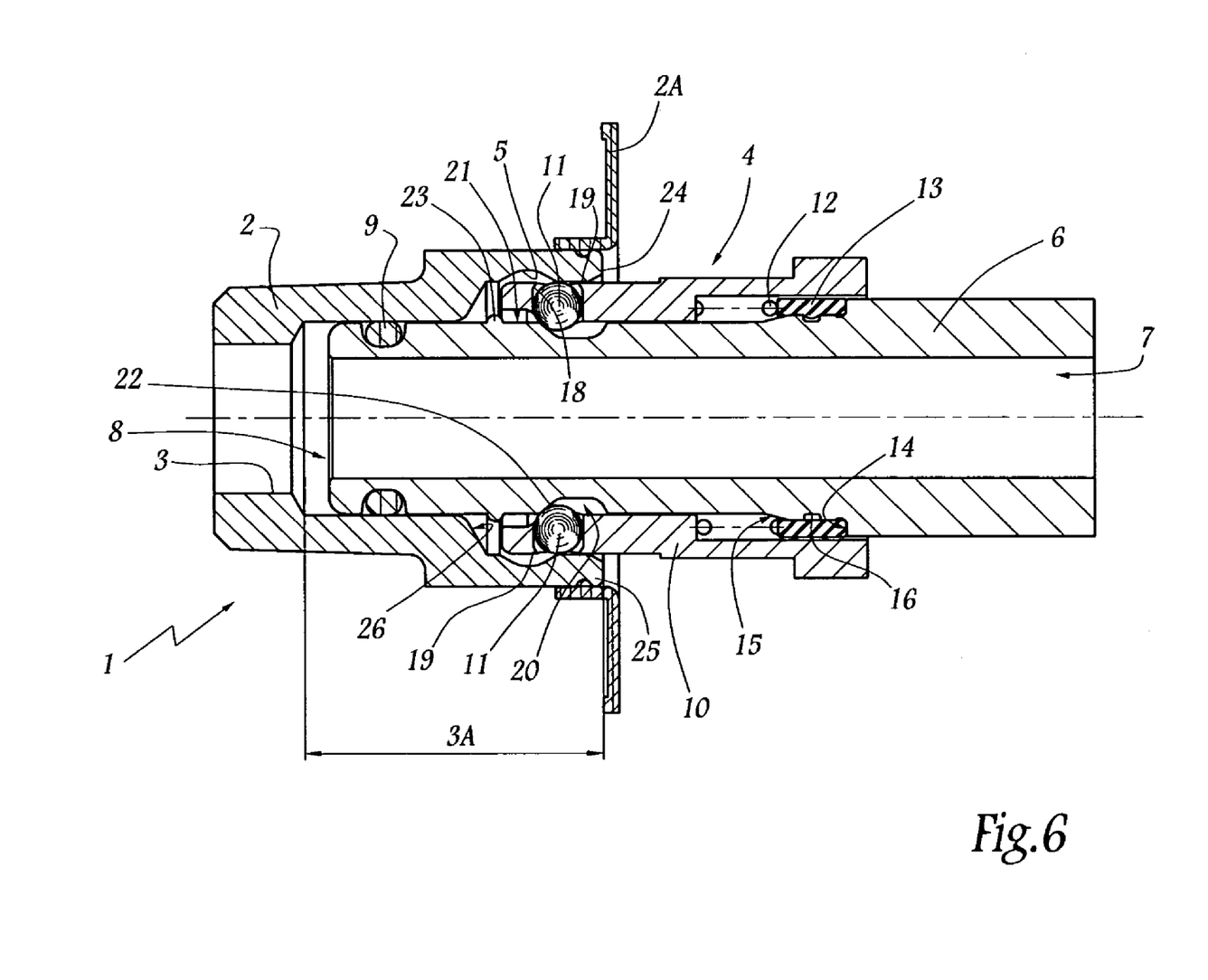
FIG. 6 is a section analogous to FIG. 2 showing a configuration in which the male and female portions of the coupling are not properly locked together.

In FIG. 6, the operator has not pushed the plug 6 far enough into the female portion 2 while coupling the male portion 4 thereto, and as a result the balls have not reached the groove 5. Although friction between the sealing ring 9 and the female portion 2 may have given the operator the impression that the plug 6 is properly locked, the operator can easily see that this is not so because the locking ring 10 is masking the indicator ring 13. Under such circumstances, corrective action can be taken.

In order to separate the male and female portions 4 and 2 when they are in the position shown in FIG. 1, the plug 6 is pushed axially towards the inside of the female portion 2 until the configuration is as shown in FIG. 5. The locking ring 10 is then stopped by an internal abutment 26 defined in the female portion 2. Once the plug 6 and the locking ring 10 are in their positions shown in FIG. 5, they can be extracted together from the female portion 2.

A plurality of hoses T, including at least one feed hose and one exhaust hose for cooling liquid need to be coupled to the mold M via a plurality of couplings 1. When two hoses T must not be swapped over, connections are made using the couplings 1 that differ in the colors of their respective collars 2A and their respective indicator rings 13. For example, a coupling 1 having a collar 2A and a indicator ring 13 that are blue can be used for coupling the feed hose, while a coupling 1 having a collar 2A and a indicator ring 13 that are red can be used for coupling the exhaust hose. This tends to reduce the risk of erroneous coupling and makes use of the mold M safer, in accordance with the object of the invention.

The invention is not limited to the embodiments described above. In particular, the sealing ring 9 need not be fitted on the plug 6 but could be fitted to the female portion 2.

The invention claimed is:

1. A quick coupling male portion for making a temporary junction between a hose (T) for conveying a cooling liquid to or from a duct (C) formed in a mold (M) that is to have the cooling liquid pass therethrough, the male portion comprising:

a male plug for inserting in a female portion of the quick coupling, said male plug being pierced by a passage for the cooling liquid;

moving balls for locking said male plug in said female portion; and a locking ring for driving said locking balls, said locking ring being movable relative to said male plug between a first position in which said locking balls can be retracted radially inside said locking ring and a second position axially offset from the first position in an insertion direction ($F_1$) for inserting said male plug into said female portion in which said locking balls are constrained to project laterally from said locking ring, wherein said male plug carries a visual indicator that is at least partially uncovered when said locking ring is in the second position and that is masked by said locking ring when said locking ring is in the first position, said visual indicator being an indicator ring that is engaged on said male plug and that is of an appearance that is different from that of said male plug, and wherein said male plug includes an abutment for said indicator ring and a spring for urging said locking ring toward the second position while urging said indicator ring against said abutment.

2. A male portion according to claim 1, wherein said indicator ring is made of a polymer material.

3. A male portion according to claim 1, wherein said indicator ring guides said locking ring during sliding movement relative to said male plug and wherein said indicator ring is made of a material such that a coefficient of friction between the material of said locking ring and the material of said indicator ring is smaller than a coefficient of friction between the material of said locking ring and the material of said male plug.

4. A male portion according to claim 1, wherein said indicator ring is clipped onto a portion in relief of said male plug.

5. A male portion according to claim 4, wherein said indicator ring carries an internal radially-extending portion in relief for engaging in or on a complementary external peripheral portion in relief on said male plug and for being held stationary relative to said male plug by co-operation between the shapes of said internal radially-extending portion in relief and said external peripheral portion in relief.

6. A quick coupling for making a temporary junction between a hose (T) for conveying cooling liquid to or from a duct (C) formed in a mold (M) that is to have the cooling liquid pass therethrough, the quick coupling comprising:
a female portion having at least one internal portion in relief suitable for enabling balls to be engaged therein so as to lock the coupling in a coupled-together position; and
a male portion including:
a male plug for inserting in said female portion of the coupling, said male plug being pierced by a passage for the cooling liquid;
moving balls for locking said male plug in said female portion; and
a locking ring for driving said locking balls, said locking ring being movable relative to said male plug between a first position in which said locking balls can be retracted radially inside said locking ring, and a second position axially offset from the first position in an insertion direction ($F_1$) for inserting said male plug into said female portion in which said locking balls are constrained to project laterally from said locking ring,
wherein said male plug carries a visual indicator that is at least partially uncovered when said locking ring is in the second position and that is masked by said locking ring when said locking ring is in the first position, said visual indicator being an indicator ring that is engaged on said male plug and that is of an appearance that is different from that of said male plug, and wherein said male plug includes an abutment for said indicator ring and a spring for urging said locking ring toward the second position while urging said indicator ring against said abutment.

7. A quick coupling according to claim 6, wherein said female portion carries a visual indicator of appearance that matches the appearance of said visual indicator ring carried by said male plug.

8. A system for making a temporary junction between a hose for conveying cooling liquid to or from a duct formed in a mold that is to have the cooling liquid pass therethrough, comprising:
a mold having a duct for cooling liquid to pass therethrough;
a hose attachable to said duct for conveying the cooling liquid; and
a quick coupling, said quick coupling including:
a female portion fitted to said mold and having at least one internal portion in relief suitable for enabling balls to be engaged therein so as to lock the coupling in a coupled-together position; and
a male portion fitted to said hose and having:
a male plug for inserting in said female portion of the coupling, said male plug being pierced by a passage for the cooling liquid;
moving balls for locking said male plug in said female portion; and
a locking ring for driving said locking balls, said locking ring being movable relative to said male plug between a first position in which said locking balls can be retracted radially inside said locking ring, and a second position axially offset from the first position in an insertion direction ($F_1$) for inserting said male plug into said female portion in which said locking balls are constrained to project laterally from said locking ring,
wherein said male plug carries a visual indicator that is at least partially uncovered when said locking ring is in the second position and that is masked by said locking ring when said locking ring is in the first position, said visual indicator being an indicator ring that is engaged on said male plug and that is of an appearance that is different from that of said male plug, and wherein said male plug includes an abutment for said indicator ring and a spring for urging said locking ring toward the second position while urging said indicator ring against said abutment.

9. A set of first and second couplings, each coupling comprising:
a female portion having at least one internal portion in relief suitable for enabling balls to be engaged therein so as to lock the coupling in a coupled-together position; and
a male portion including:
a male plug for inserting in said female portion of the coupling, said male plug being pierced by a passage for the cooling liquid,
moving balls for locking said male plug in said female portion, and
a locking ring for driving said locking balls, said locking ring being movable relative to said male plug between a first position in which said locking balls can be retracted radially inside said locking ring, and a second position axially offset from the first position in an insertion direction ($F_1$) for inserting said male plug into said female portion in which said locking balls are constrained to project laterally from said locking ring,
wherein said male plug carries a visual indicator that is at least partially uncovered when said locking ring is in the second position and that is masked by said locking ring when said locking ring is in the first position, said visual indicator being an indicator ring that is engaged on said male plug and that is of an appearance that is different from that of said male plug,
wherein said male plug includes an abutment for said indicator ring and a spring for urging said locking ring toward the second position while urging said indicator ring against said abutment,
and wherein said female portion carries a visual indicator of an appearance that matches the appearance of the visual indicator ring carried by the corresponding male portion;
wherein the visual indicators of the first coupling differs from the appearance of the visual indicators of the second coupling.

10. A quick coupling male portion for making a temporary junction between a hose (T) for conveying a cooling liquid to or from a duct (C) formed in a mold (M) that is to have the cooling liquid pass therethrough, the male portion comprising:

a male plug for inserting in a female portion of the quick coupling, said male plug being pierced by a passage for the cooling liquid;

moving balls for locking said male plug in said female portion; and a locking ring for driving said locking balls, said locking ring being movable relative to said male plug between a first position in which said locking balls can be retracted radially inside said locking ring and a second position axially offset from the first position in an insertion direction ($F_1$) for inserting said male plug into said female portion in which said locking balls are constrained to project laterally from said locking ring, wherein said male plug carries a visual indicator that is at least partially uncovered when said locking ring is in the second position and that is masked by said locking ring when said locking ring is in the first position, said visual indicator being an indicator ring that is clipped onto a portion in relief of said male plug and that is of an appearance that is different from that of said male plug.

11. A male portion according to claim 10, wherein said male plug includes an abutment for said indicator ring and a spring for urging said locking ring toward the second position while urging said indicator ring against said abutment.

\* \* \* \* \*